(No Model.)

W. C. AHRENBECK.
APPARATUS FOR BARRELING SOAP STOCK.

No. 576,934. Patented Feb. 9, 1897.

Witnesses
D. H. Blakelock
Percy C. Bowen

Inventor
W. C. Ahrenbeck
By Whitman & Wilkinson
Attorneys

United States Patent Office.

WILLIAM C. AHRENBECK, OF BRENHAM, TEXAS.

APPARATUS FOR BARRELING SOAP-STOCK.

SPECIFICATION forming part of Letters Patent No. 576,934, dated February 9, 1897.

Application filed September 15, 1896. Serial No. 605,913. (No model.)

*To all whom it may concern:*

Be it known that I, WILLIAM C. AHRENBECK, a citizen of the United States, residing at Brenham, in the county of Washington and State of Texas, have invented certain new and useful Improvements in Apparatus for Barreling Soap-Stock, &c.; and I do hereby declare the following to be a full, clear, and exact description of the invention, such as will enable others skilled in the art to which it appertains to make and use the same.

My invention relates to an apparatus for filling barrels with soap-stock or other thick liquid of similar consistency, the object being to provide a machine whereby the barrels may be filled quickly through the bung-hole; and it consists of the novel construction and arrangement of apparatus to be hereinafter fully described and claimed.

Figure 1:
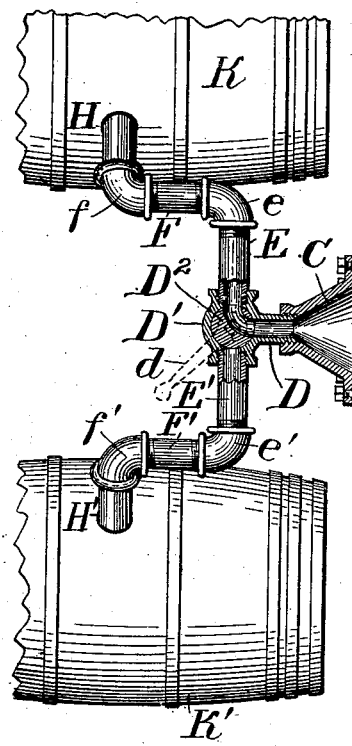
Figure 1:
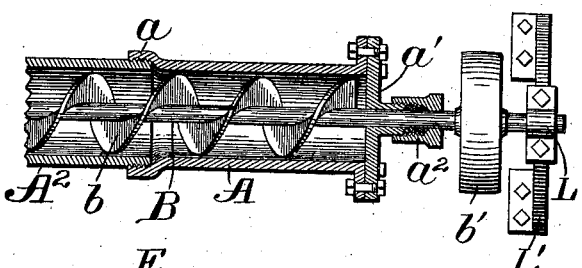
Figure 3:
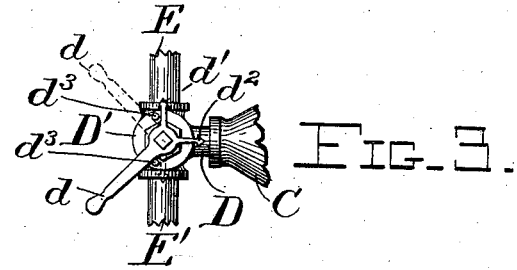
Figure 2:
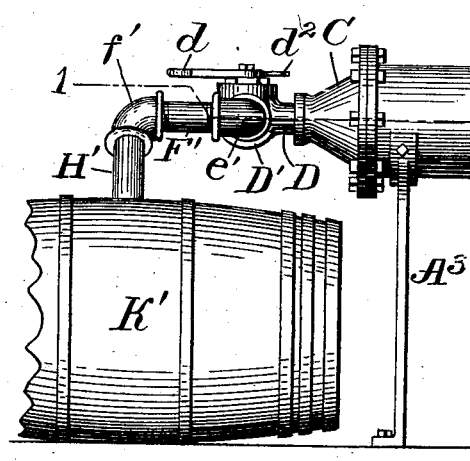
Figure 2:
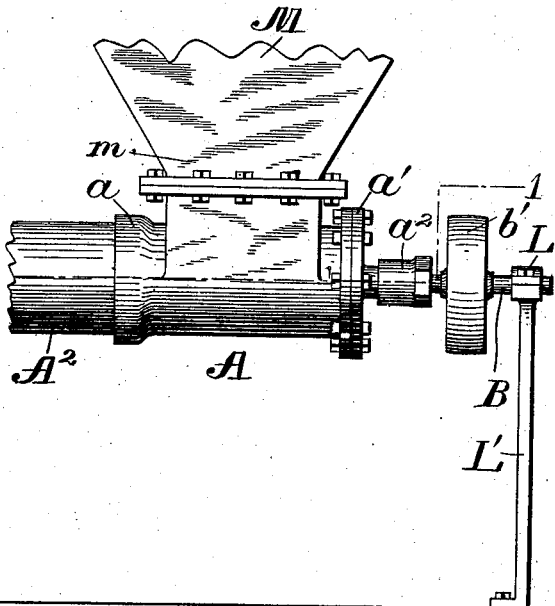

Referring to the accompanying drawings, in which like letters of reference designate the same parts in the several views, Figure 1 represents a horizontal section of the device, taken on the line 1 1 of Fig. 2. Fig. 2 represents a side elevation of the device; and Fig. 3 is a detail plan view of the three-way valve, handle, and indicator.

A designates a cylindrical chamber bolted to the lower end $m$ of a tank M, which may be of any suitable size and shape and supported in any well-known manner. The said chamber A is enlarged at one end, as at $a$, and interiorly screw-threaded to receive the threaded end of a pipe or cylinder $A^2$, having the same interior diameter as the chamber A and forming therewith a long cylindrical chamber A $A^2$, the end A of which is supported by the tank M, which opens into the said chamber A, and the opposite end is supported by the upright $A^3$.

The end of the chamber A is closed by the end piece $a'$, which is centrally perforated and provided with a stuffing-box $a^2$ for the passage of a shaft B. The opposite end of the cylindrical chamber A $A^2$ is closed by a conical cap C, the smaller end of which is screw-threaded to receive a pipe D, leading to a three-way valve-chamber D'. Pipes E E' extend from opposite sides of the said valve-chamber and are connected by screw-threaded elbows $e\ e'$ with other pipes F F'', which are in turn connected by elbows $f\ f'$ with pipes H H', which may be turned at any angle to enter the bung-holes of the barrels K K'. The pipes H H' may be lifted from the bung-holes of the barrels, the several elbows and pipes turning on their screw-threads sufficiently to allow the pipes H H' to be raised clear of the barrels.

The three-way valve $D^2$ is arranged to open a passage from the cone-shaped end C of the chamber A $A^2$ to one of the pipes E or E', and the said valve is controlled by a lever or handle $d$, which is provided with indicators $d'$ and $d^2$, which always point to the two passages which are open into each other.

In Fig. 3 of the drawings I have shown the indicator $d'$ pointing to the pipe E and the indicator $d^2$ pointing to the pipe D from the cone C, showing that the passage is open from the cone C to the pipe E and thence to the barrel K, as shown in Fig. 1. When the handle $d$ is turned as shown in dotted lines in Fig. 3, the valve D' will be turned to open into the pipe E' and the indicator $d^2$ will point to the pipe E', as shown in dotted lines, the indicator $d'$ pointing to the pipe D. Stops $d^3$ are provided to stop the lever $d$ when the passage to either of the pipes is fully opened.

The shaft B is journaled in a bearing L on an upright L' in line with the center of the chamber A $A^2$ and passes through the stuffing-box $a^2$, which forms another bearing therefor, and extends through the chamber A $A^2$ to the large end of the cone C. This shaft B is provided inside of the chamber A $A^2$ with a spiral flange $b$ and is provided outside of the said chamber with a pulley $b'$, to which power may be applied to drive the said shaft B and cause the spiral flange $b$ to propel the contents of the chamber toward the cone C.

A tank M is secured to the chamber A and opens into the same.

The operation of the invention is as follows: The soap-stock is contained in the tank M, and a barrel is placed under one of the pipes H or H', the handle $d$ of the valve being turned so that the indicator $d'$ or $d^2$ will point toward the barrel to be filled, for instance, the barrel K. The power is applied to the pulley $b'$ to rotate the shaft B, and the spiral flange $b$ will force the soap-stock through the chamber A $A^2$ and through the cone C, the pipe D, valve D', and pipes E, F, and H into the barrel K. Before the first barrel is filled the second barrel K' is placed beneath the pipe H', and when the barrel K is full the attendant throws the valve-handle $d$ around against the other stop $d^3$, which turns the flow into the barrel K'. While this barrel is filling the first barrel K may be removed and an empty barrel substituted therefor. Thus the operation of filling the barrels may go on without interruption until the desired number of barrels have been filled. Should it be necessary to shut off the flow entirely at the valve $D^2$, as in case of stopping with the chamber A $A^2$ full of fluid, the lever $d$ may be turned half-way between the two stops $d^3$, which will close the opening from the pipe D, as will be seen from an inspection of Fig. 1 of the drawings.

The numerous advantages of this apparatus will be apparent to those skilled in the art to which it appertains.

Having thus described my invention, what I claim, and desire to secure by Letters Patent of the United States, is—

In an apparatus of the character described, a cylindrical chamber, a tank opening into one end of the said chamber, a conical cap closing the other end of the said chamber, a spiral conveyer within the said chamber, and means for rotating the said conveyer; of a three-way valve controlling the flow from the said chamber, a handle on the said three-way valve having indicators $d'$ and $d^2$, discharge-pipes leading from the sides of the said three-way valve, said discharge-pipes being formed in sections connected by elbows to allow the said discharge-pipes to be raised or lowered, substantially as described.

In testimony whereof I affix my signature in presence of two witnesses.

WILLIAM C. AHRENBECK.

Witnesses:
  JO SMITH,
  W. B. VAN HUTTON.